Nov. 11, 1969         J. L. MARTIN         3,477,216
SUSPENSION SHOCK ABSORBER FOR TREE SHAKING DEVICES
Filed Feb. 24, 1967

INVENTOR.
JACK L. MARTIN,
BY
Kimmel, Crowell & Weaver,
ATTORNEYS.

United States Patent Office 3,477,216
Patented Nov. 11, 1969

3,477,216
SUSPENSION SHOCK ABSORBER FOR
TREE SHAKING DEVICES
Jack L. Martin, 5144 Western Ave.,
Olivehurst, Calif. 95961
Filed Feb. 24, 1967, Ser. No. 618,541
Int. Cl. A01g *19/00;* F16m *1/02*
U.S. Cl. 56—328  2 Claims

ABSTRACT OF THE DISCLOSURE

A tree shaking device suspension for a vibratory mechanism comprising upper and lower bolts resiliently connected to a support frame and the vibratory mechanism respectively and a cylindrical interconnection member securing two sets of annular resilient disks which in turn are received about the upper and lower bolts and form a resilient interconnection therebetween is disclosed.

BACKGROUND OF THE INVENTION

Field of the invention

This invention relates to harvesting devices and more particularly to devices for shaking fruit and nut trees to remove the fruit and nuts therefrom. More specifically, this invention relates to a resilient suspension means for a tree shaking vibratory mechanism.

Description of the prior art

Tree shaking devices of the type disclosed herein are, in their general form, well known in the prior art. Many various suspension means and shock absorbing means have been utilized to permit the vibratory mechanism to transmit shock waves to a tree to thereby dislodge the nuts therefrom but a problem has developed with respect to the more effective vibratory mechanisms and cushioning devices. Not infrequently, a major fraction of the vibratory energy developed is transmitted to the vehicle which carries the shaking device. This vibratory energy which is transmitted to the vehicle increases the fatigue of the operator and, more importantly, tends to loosen bolts, nuts, electrical connections and the like in the vehicle and in general to shake the vehicle apart. The present invention relates to a shock absorbing suspension means for reducing the amount of vibratory energy which is transmitted to the vehicle.

SUMMARY

The present invention is directed toward means for suspending the vibratory mechanism of a tree shaker from a support frame to thereby reduce the vibratory energy which is ultimately transmitted through the boom to a vehicle. The objects of the invention include the following:

The provision of a novel suspension means which includes upper and lower elongate members and resilient means interconnecting the elongate members.

The provision of novel interconnection means between upper and lower elongate members which includes a cylinder, upper resilient disks and lower resilient disks for respectively supporting the interconnection member and for supporting the lower elongate member therefrom.

The overall combination, the structural features, and the combinational and constructional elements disclosed herein constitute important features of the invention also.

DESCRIPTION OF THE PREFERRED EMBODIMENT

Figure 1:
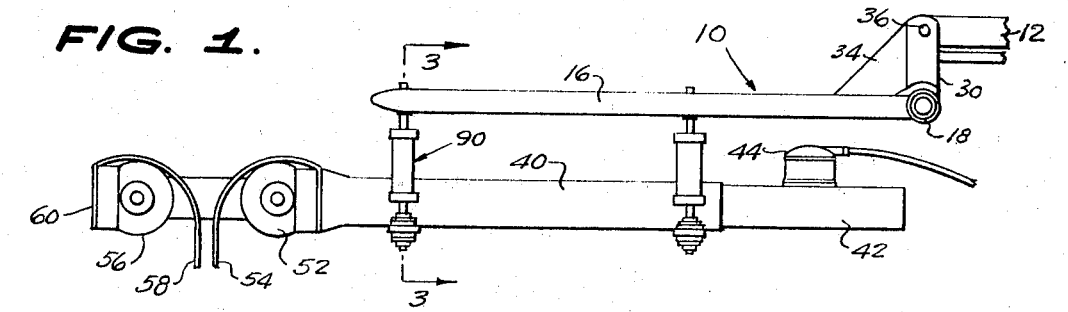
FIGURE 1 is a side elevational view of a tree shaker incorporating the vibratory suspension means of this invention.
Figure 2:
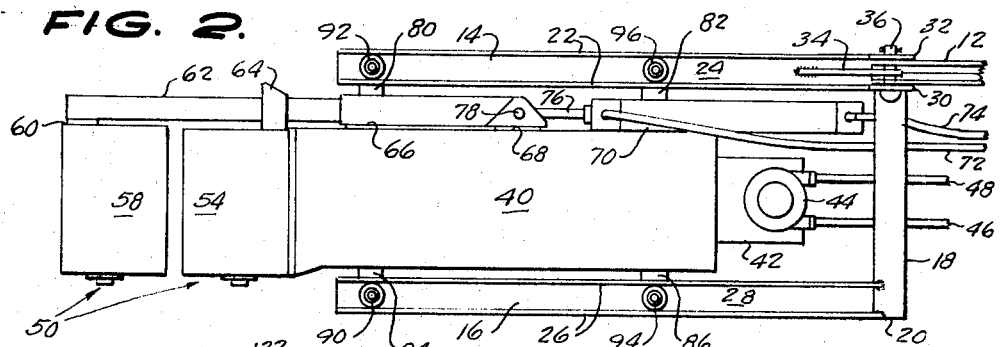
FIGURE 2 is a top plan view of the tree shaker of FIGURE 1 employing the suspension means of this invention.

Reference is made first to FIGURE 1 which illustrates a support frame 10 which may be pivotally supported from the boom 12 in a manner to be described. The support frame comprises, as best shown in FIGURE 2, a pair of generally parallel arms 14 and 16 connected at one end by a bight portion 18 which may be a tubular member. The arms 14 and 16 may be secured to the bight portion 18 as by a weldment 20.

Arm 14, preferably, comprises an H-beam having a pair of upright side members 22 connected by an intermediate load-bearing member 24. Arm 16 is similarly constructed having a pair of upright side members 26 and an intermediate support surface or load-bearing member 28. Frame 10 preferably is pivotally supported by means of a pair of uprights 30 and 32 and an upright support 34 and is pivotally connected by means of pin 36 to boom 12. Means for controlling the position of the boom and for controlling the position of the support frame 10 relative to the boom are conventionally provided but are not shown, since they constitute no integral part of the present invention.

Suspended from the support frame 10 in a manner to be described, may be a conventional shaker assembly 40 which may include a rearward extension 42 supporting a rotary vibratory motor 44 which receives fluid from line 46 and returns the fluid to line 48, said fluid providing the energizing force for the rotary vibratory motor 44. The vibratory motor 44 may be connected by any conventional means to the buffer unit shown generally at 50 for transmitting vibratory energy thereto. The buffer unit 50 comprises a resilient cushion 52 and a protective cover 54 and a resilient cushion 56 and a protective cover 58. The resilient cushion 58 is connected to a movable jaw 60 which is, in turn, supported by an elongate reciprocable jaw support 62 which is slidably received in a guide bracket 64 and connected to carriage 66 which is in turn slidably mounted in the vibratory mechanism frame 40 as shown at 68. The position of jaw 60 is controlled by a linear fluid motor 70 which is operated by fluid received in lines 72 and 74 and is connected by piston rod 76 and pin 78 to the carriage 66. Of course, any conventional vibratory system may be used with the present invention.

A plurality of support ears 80, 82, 84 and 86 are secured to the vibratory mechanism 40 and form support extensions therefor.

The vibratory mechanism 40 is resiliently suspended from the support frame by resilient suspension shock absorbing means 90, 92, 94 and 96. One of such shock absorbing suspension members is shown in greater detail in FIGURE 3 to which reference is now made.

Figure 3:
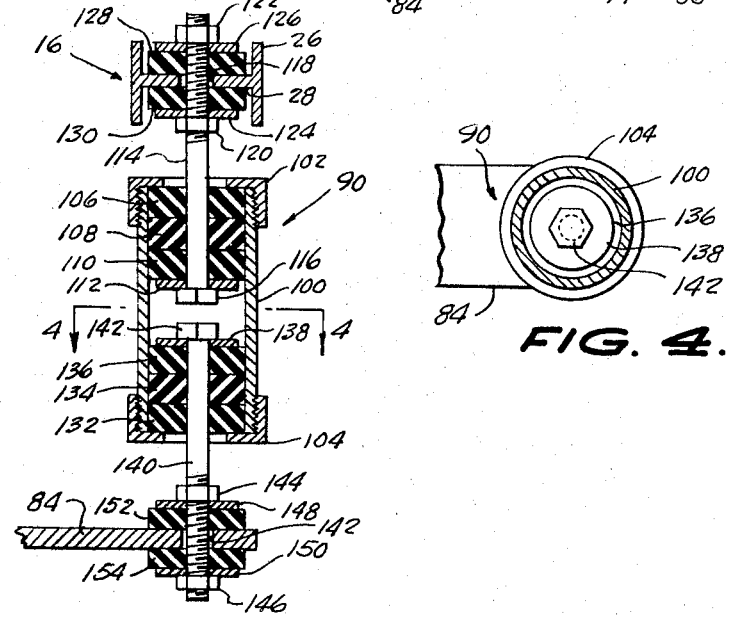
FIGURE 3 is a side view in cross section taken substantially along lines 3—3 in FIGURE 1 of the novel suspension shock absorbing means of this invention.
Figure 4:
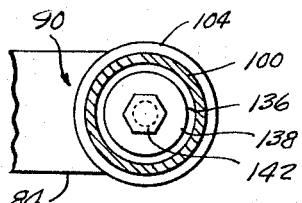
FIGURE 4 is a top view in partial cross section taken substantially along lines 4—4 in FIGURE 3 of the suspension shock absorbing means of this invention.

In the preferred embodiment, as shown in FIGURE 3, a cylindrical interconnection member 100 is provided with caps 102 and 104 at the respective ends thereof. A plurality of annular resilient shock absorbing disk-like members 106, 108 and 110 are provided in the upper end of cylinder 100. A washer 112 is disposed below the disk 110. An upper elongate bolt 114 having a head 116, is received through apertures in the washer 112, the annular disks 106, 108 and 110, the cap 102 and extends through aperture 118 in load-bearing portion 28 of arm 16.

The upper elongate bolt 114, is secured in arm 16 by means of a pair of nuts 120 and 122 which cooperate with washers 124 and 126 and resilient annular disks 128 and 130 to provide a resilient suspending support for the elongate bolt 114.

Referring again to cylinder 100, proximate the lower end thereof resilient shock absorbing annular disk-like members 132, 134 and 136 are received in cylinder 100 and retained there by cap 104. Washer 138 may preferably be disposed above resilient disk 136. A lower elongate bolt 140 having a head 142 thereon, extends into cylinder 100 and is received through apertures in washer 138, resilient shock absorbing disks 132, 134 and 136, and cap 104. The elongate bolt 140 extends through an aperature 142 in support ear 84 and is resiliently secured in place by means of nuts 144 and 146, washers 148 and 150 and resilient disks 152 and 154.

Thus it will be seen that the vibratory mechanism 40 is suspended by a shock absorbing resilient suspension means which includes cylinder 100, a plurality of resilient disks disposed in the upper portion thereof and a plurality of resilient disks disposed in the lower portion thereof, an upper elongate bolt 114 extending through the upper resilient disks for supporting the interconnection member 100 and a lower elongate bolt 140 extending through the lower resilient disks for supporting the vibratory mechanism through interconnection means 100.

It will be apparent that the shock waves generated by the vibratory motor 44 and transmitted to the vibratory mechanism 40 generally, will be absorbed by the shock absorbing system 90 of this invention and will not be transmitted, in any substantial portion, to arms 14 and 16. There is no direct path for the transmission of shock energy from the vibratory frame 40 to the arms 14 and 16 except through the plurality of shock absorbing resilient disks 106, 108 and 110 and 132, 134 and 136. The present shock absorbing system has been found, in practice, to be much more effective than previous suspension means in reducing the amount of shock ultimately transmitted to the vehicle and for preserving the life of the vehicle and preventing fatigue of the operator.

It will be realized that while a specific embodiment of the invention has been disclosed, the abstract, summary and disclosure have been drawn with respect to the specific embodiment in order to permit those skilled in the art to practice the invention and the disclosure, summary and abstract are not intended in the limiting sense.

I claim:

1. In a tree shaker of the type having a boom, a support frame including a pair of spaced apart parallel arms carried by the boom, vibratory tree shaking means, a pair of spaced apart means on each of the arms supporting the vibratory tree shaking means from the support frame, and resilient tree engaging means carried by the vibratory tree shaking means for engaging a tree and shaking said tree, the improvement wherein each of the means support the vibratory tree shaking means from the support frame comprises:
   an upper elongate bolt;
   a first resilient shock absorbing means connecting the upper elongate bolt at the upper end thereof to the support frame;
   a lower elongate bolt;
   a second resilient shock absorbing means connecting the lower elongate bolt at the lower end thereof to the vibratory tree shaking means; and
   a third resilient shock absorbing means interconnecting the lower end of the upper elongate bolt and the upper end of the lower elongate bolt in resilient shock absorbing relation to thereby suspend the vibratory means from the support frame for reducing transmission of vibratory energy from the vibratory tree shaking means to the boom, said third resilient shock absorbing means including:
      an elongate cylinder;
      a plurality of upper annular resilient separate disk-like members received around the upper elongate bolt and supported thereby, said disk-like members being received in said elongate cylinder proximate an upper end thereoff;
      a cap removably mounted on the upper end of said cylinder retaining said disk-like members therein;
      a plurality of lower annular resilient separate disk-like members received in the elongate cylinder proximate a lower end thereof; and
      a cap removably mounted on the lower end of said cylinder for retaining the lower disk-like members in said elongate cylinder to thereby support said disk-like members therein, said lower elongate bolt being received in and supported by said lower disk-like members.

2. The invention of claim 1 wherein the first resilient shock absorbing means connecting the upper elongate bolt to the support frame comprises:
   a first upper resilient annular disk disposed above a support surface on the support frame;
   a first lower resilient annular disk disposed below the support surface, said upper elongate bolt extending through said disks and an aperature in said support frame; and
   retaining means on distal sides of said disks securing the upper elongate bolt therethrough in supported relation relative to the support frame;
   the vibratory means includes an apertured support member for each of the means supporting it; and
   the means connecting the lower elongate bolt to the vibratory means comprises:
      a second upper resilient annular disk disposed above said apertured support member;
      a second lower resilient annular disk disposed below said apertured support member; and
      retaining means on distal sides of said disks securing said lower elongate bolt therethrough to thereby support said vibratory means.

References Cited
UNITED STATES PATENTS

| | | | |
|---|---|---|---|
| 1,696,602 | 12/1928 | Harder et al. | 248—9 |
| 1,703,765 | 2/1929 | Duffy | 248—358 X |
| 2,156,301 | 5/1939 | Loewus | 248—358 |
| 2,226,505 | 12/1940 | Saurer | 248—358 X |
| 2,241,026 | 5/1941 | Wylie | 248—9 |
| 2,389,562 | 11/1945 | Storch | 248—358 |
| 2,708,560 | 5/1955 | Paley | 248—358 X |
| 2,969,656 | 1/1961 | Reuter | 248—8 X |
| 3,163,458 | 12/1964 | Brandt | 56—328 |
| 3,338,040 | 8/1967 | Shipley | 56—328 |

LOUIS G. MANCENE, Primary Examiner

PASQUALE A. RAZZANO, Assistant Examiner

U.S. Cl. X.R.

248—9, 358